United States Patent
Yoo et al.

(10) Patent No.: US 9,677,597 B2
(45) Date of Patent: Jun. 13, 2017

(54) HANGING SYSTEMS

(71) Applicant: Mina Yoo, Seattle, WA (US)

(72) Inventors: Mina Yoo, Seattle, WA (US); John S. Bandringa, Everett, WA (US)

(73) Assignee: Mina Yoo, Seattle, WA (US)

( * ) Notice: Subject to any disclaimer, the term of this patent is extended or adjusted under 35 U.S.C. 154(b) by 0 days.

(21) Appl. No.: 15/093,446

(22) Filed: Apr. 7, 2016

(65) Prior Publication Data

US 2016/0298675 A1 Oct. 13, 2016

Related U.S. Application Data

(60) Provisional application No. 62/144,038, filed on Apr. 7, 2015, provisional application No. 62/204,898, filed on Aug. 3, 2015.

(51) Int. Cl.
*A47H 1/10* (2006.01)
*F16B 45/02* (2006.01)
*F16M 13/02* (2006.01)

(52) U.S. Cl.
CPC ............. *F16B 45/02* (2013.01); *F16M 13/02* (2013.01)

(58) Field of Classification Search
CPC ......... A47G 25/08; F16B 21/00; F16B 45/00; A47F 5/0006
See application file for complete search history.

(56) References Cited

U.S. PATENT DOCUMENTS

| 4,380,101 A | 4/1983 | Joubert et al. |
| 5,607,248 A * | 3/1997 | Hasse .................... F16G 15/08 403/165 |
| 5,772,350 A * | 6/1998 | Ferguson ................ E21B 17/05 277/345 |
| 5,913,479 A | 6/1999 | Westwood, III |
| 6,554,524 B1 * | 4/2003 | Smith ..................... H02G 7/04 403/164 |
| 9,131,758 B2 * | 9/2015 | Stein .................... A45C 13/001 |
| 2005/0050695 A1 | 3/2005 | Mackey et al. |
| 2008/0083862 A1 | 4/2008 | Salatka |
| 2014/0317892 A1 | 10/2014 | Yoo et al. |

OTHER PUBLICATIONS

International Search Report, Sep. 7, 2016.

* cited by examiner

*Primary Examiner* — Amy Sterling
(74) *Attorney, Agent, or Firm* — Olympic Patent Works PLLC

(57) ABSTRACT

Portable, compact hanging systems that enable a person to hang items from a wide variety of different objects and surfaces in order to free their hands for other activities are described. The hanging systems include hook and gated-loops systems composed of a hook connected to a gated loop by way of a rotatable hinge that provides multiple degrees of freedom. Hanging systems also include double hook systems that are connected by flexible joints for convenient storage and expansion into unfolded configurations when in use.

15 Claims, 10 Drawing Sheets

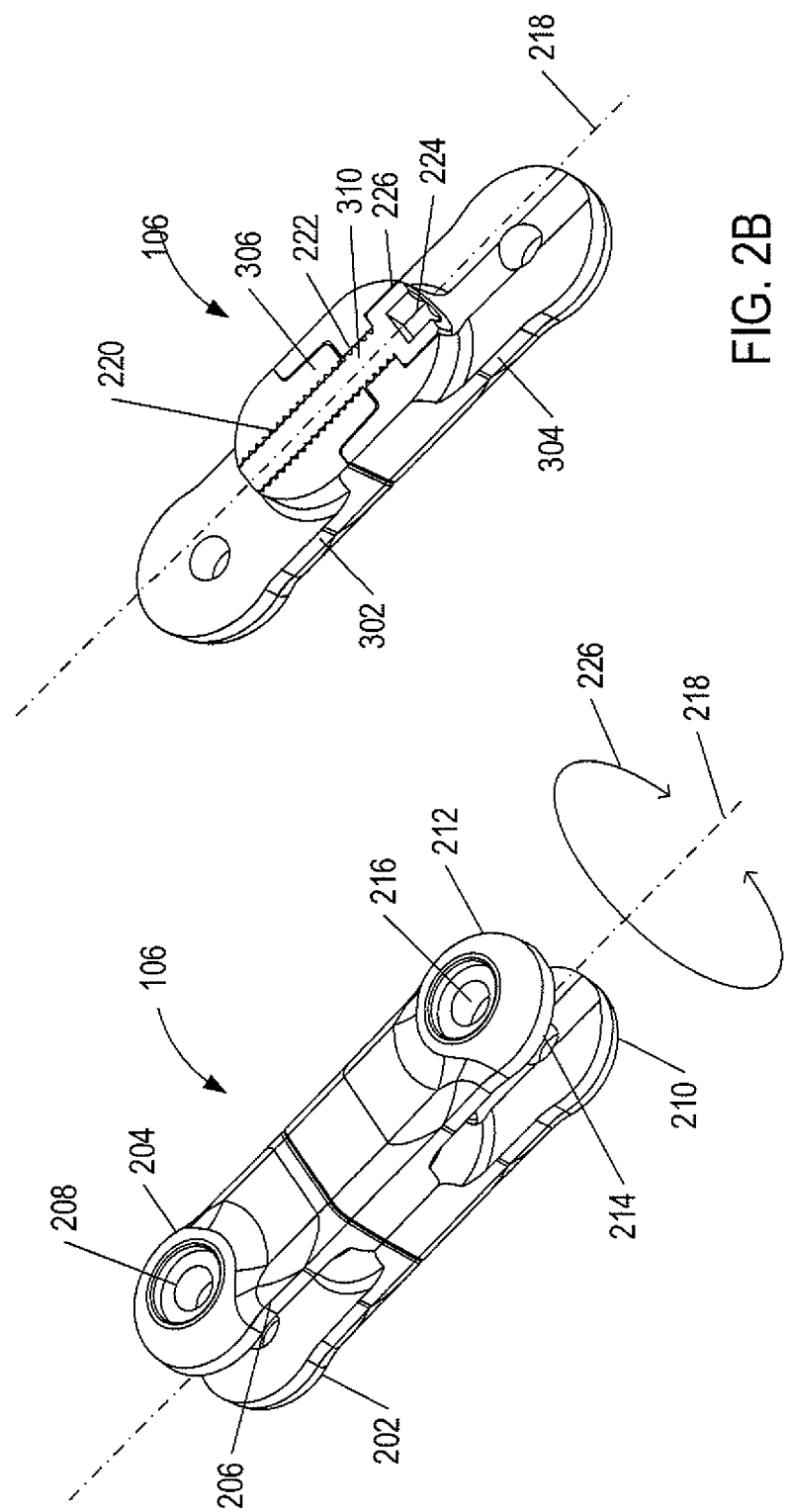

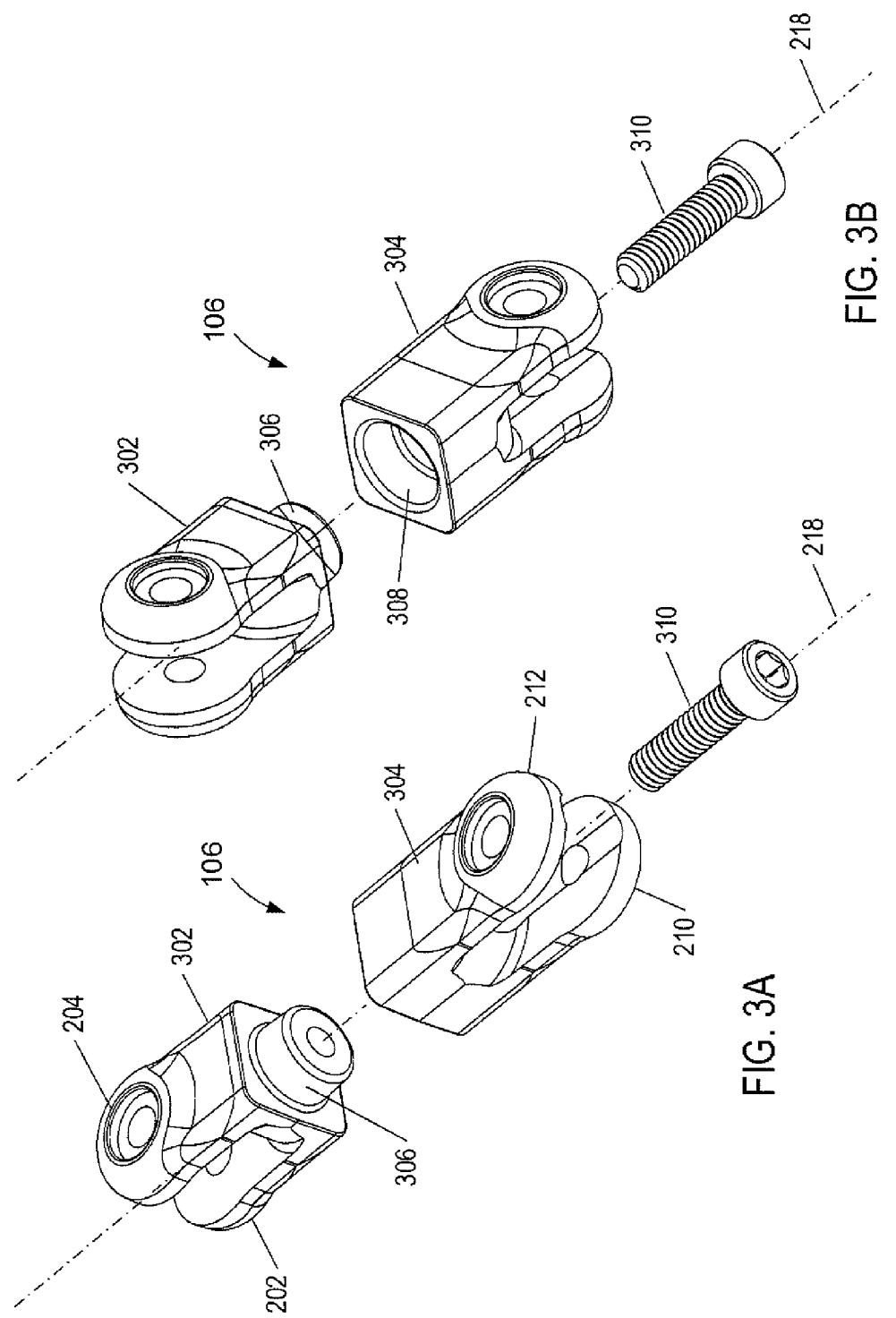

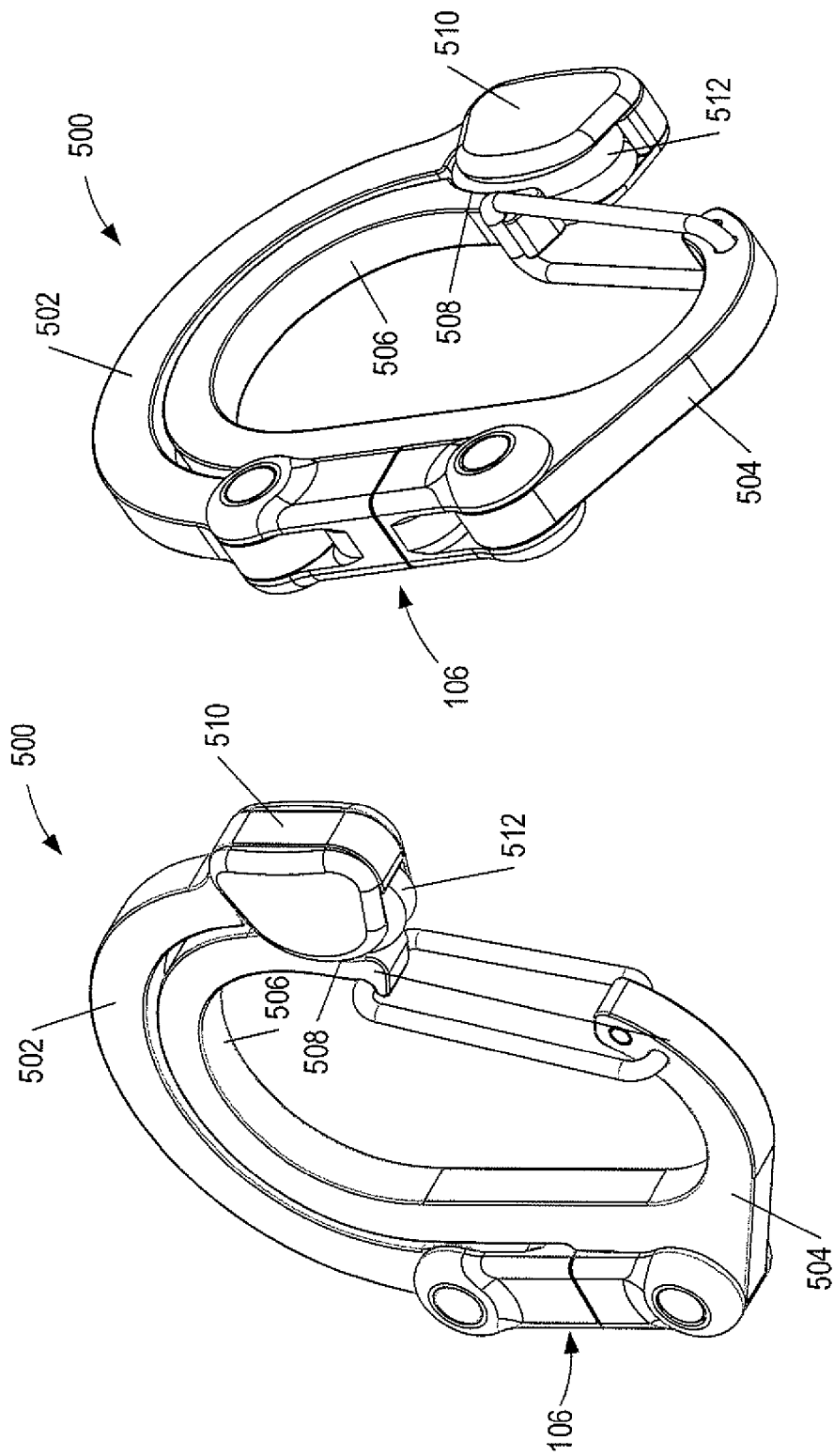

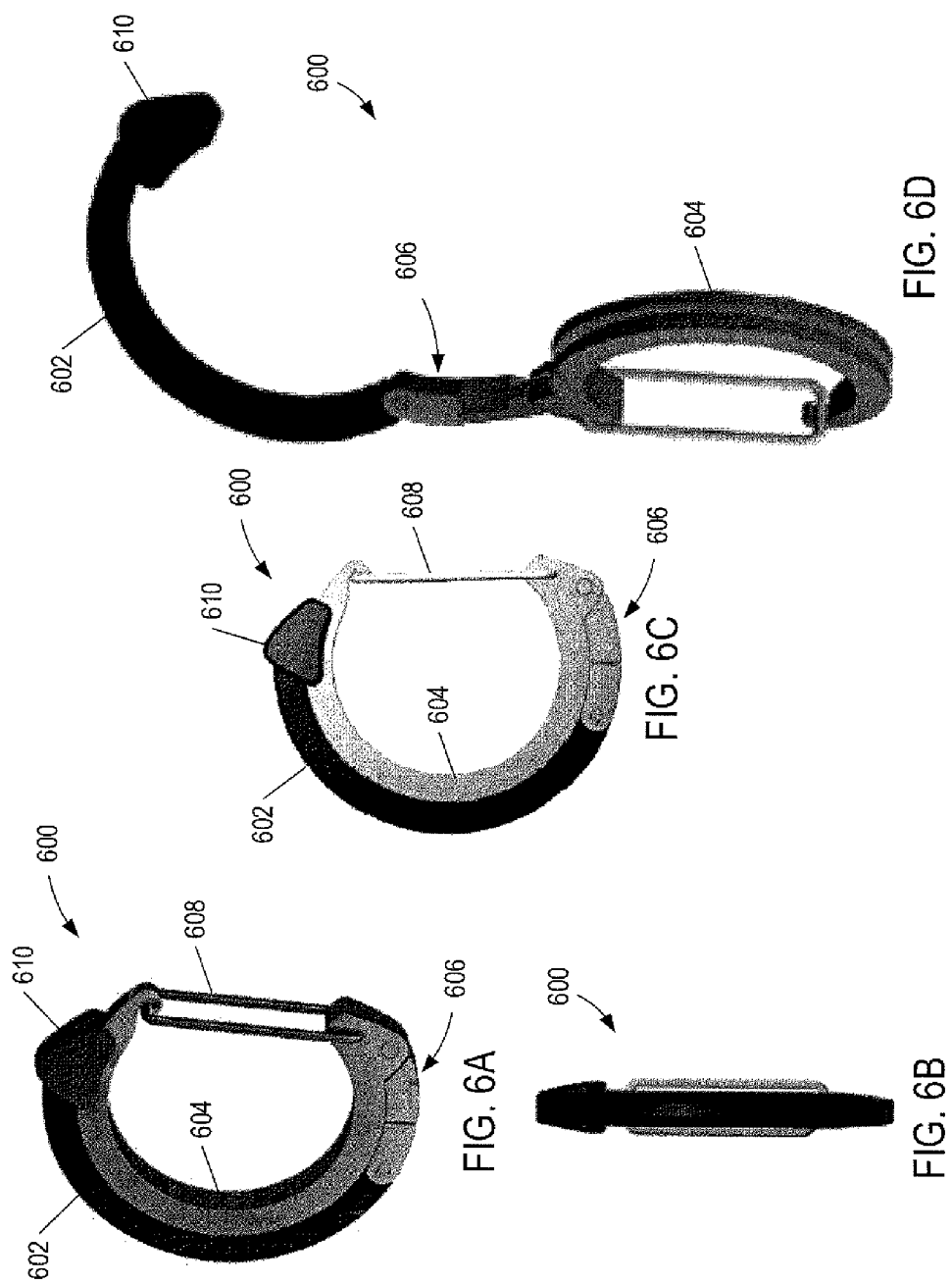

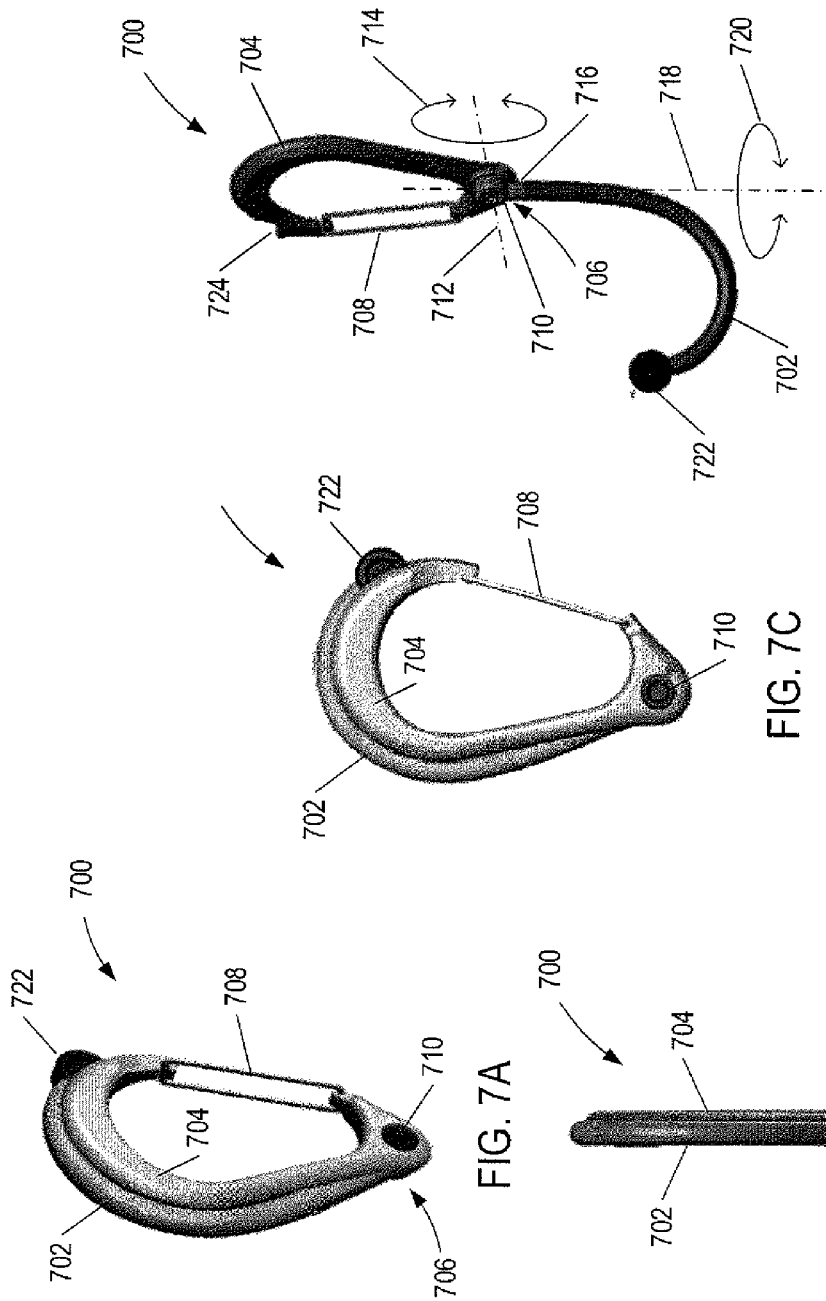

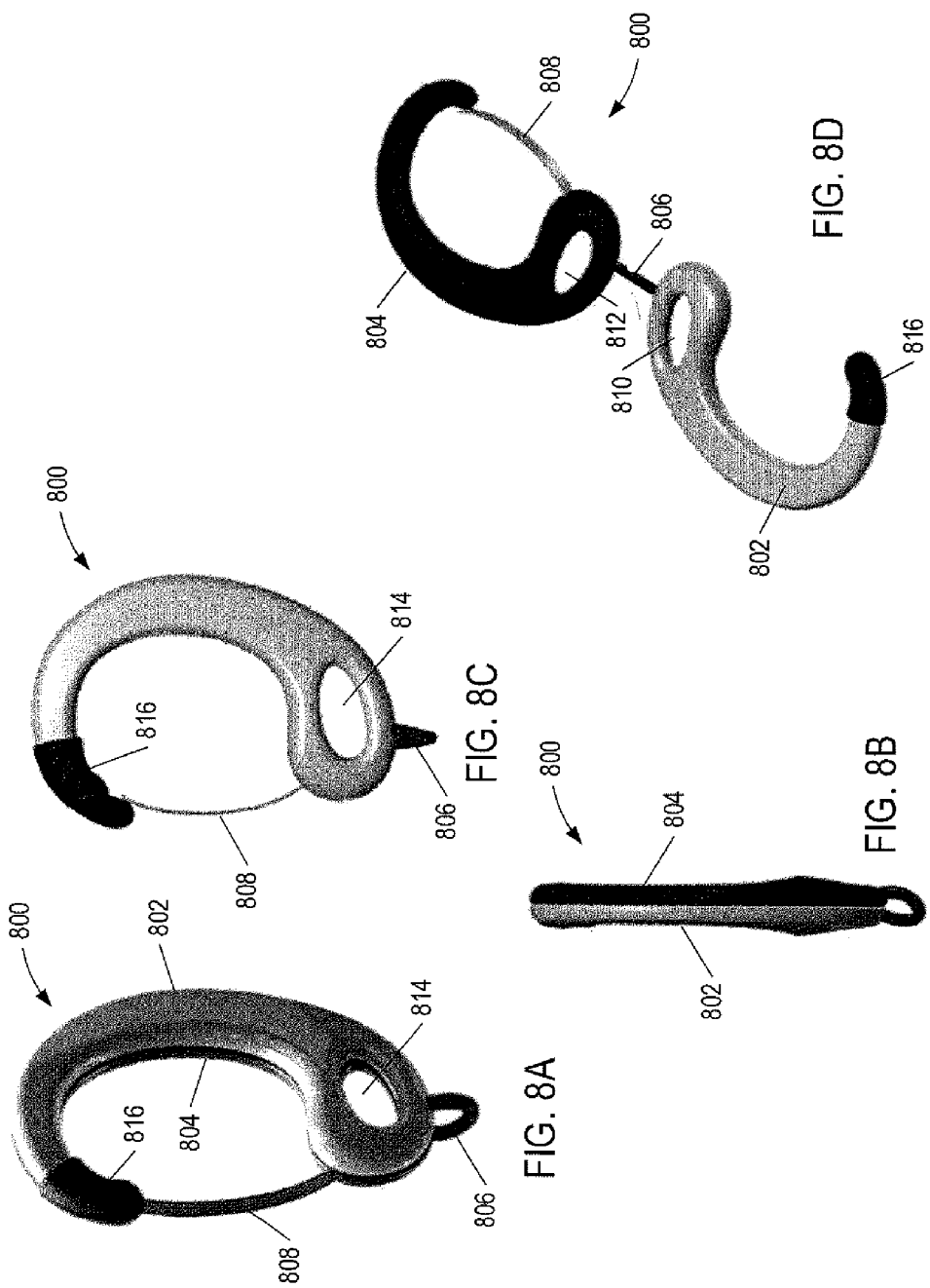

HANGING SYSTEMS

CROSS-REFERENCE TO RELATED APPLICATIONS

This application claims the benefit of U.S. Provisional Patent Application Ser. No. 62/144,038, filed Apr. 7, 2015, and U.S. Provisional Patent Application Ser. No. 62/204,898, filed Aug. 13, 2015.

BACKGROUND

People often find themselves in situations where their hands are busy and, as a result, they are not able to hold certain items. For example, diaper-changing typically takes two hands as well as a diaper bag to hold wipes and clean diapers. Even when there is a changing table, there may not be enough space available for the diaper bag and it may not be desirable to place the diaper bag on the floor. Another situation may occur when a person is traveling and would like to temporarily connect one piece of luggage to another, to a luggage cart, or to another surface, all while holding travel documents or walking through an airport or train station. Another situation may occur when a person is hiking and would like to temporarily hang a bag or another item on a tree limb or rock ledge while resting.

SUMMARY

This disclosure is directed to portable, compact hanging systems that enable items to be hung from a wide variety of different objects and surfaces. The hanging systems include hook and gated-loops systems composed of a hook connected to a gated loop by way of a rotatable hinge that allows the hook and gated-loops systems to be stored in a compact folded configuration and easily unfolded for use. Hanging systems also include double hook systems that are connected by flexible joints that enable the double hook systems to be conveniently stored when not is use and expanded into unfolded configurations when in use.

DESCRIPTION OF THE DRAWINGS

FIG. 2A shows an isometric view of a rotatable hinge.
FIG. 2B shows a cross-sectional view of a rotatable hinge.
FIGS. 3A-3B show exploded isometric views of a rotatable hinge.
FIGS. 5A-5B show isometric views of a hook and gated-loop system in a folded configuration.
FIGS. 6A-6D show views of a hook and gated-loop system in folded and unfolded configurations.
FIGS. 7A-7D show views of a hook and gated-loop system in folded and unfolded configurations.
FIGS. 8A-8D show views of a hook and gated-loop system in folded and unfolded configurations.

DETAILED DESCRIPTION

Figure 1B:
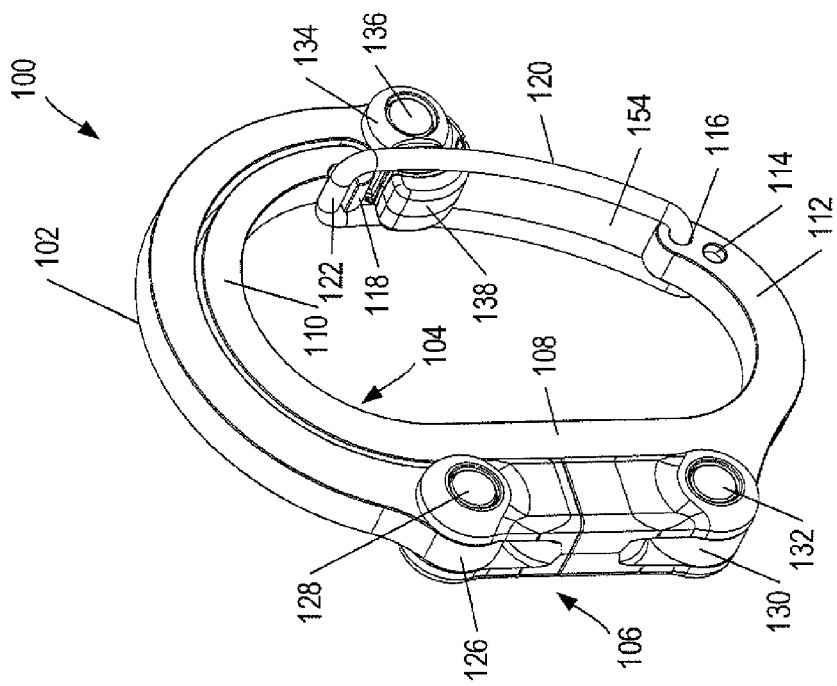
FIGS. 1A-1B show different views of a hook and gated-loop system in a folded configuration.
Figure 1A:
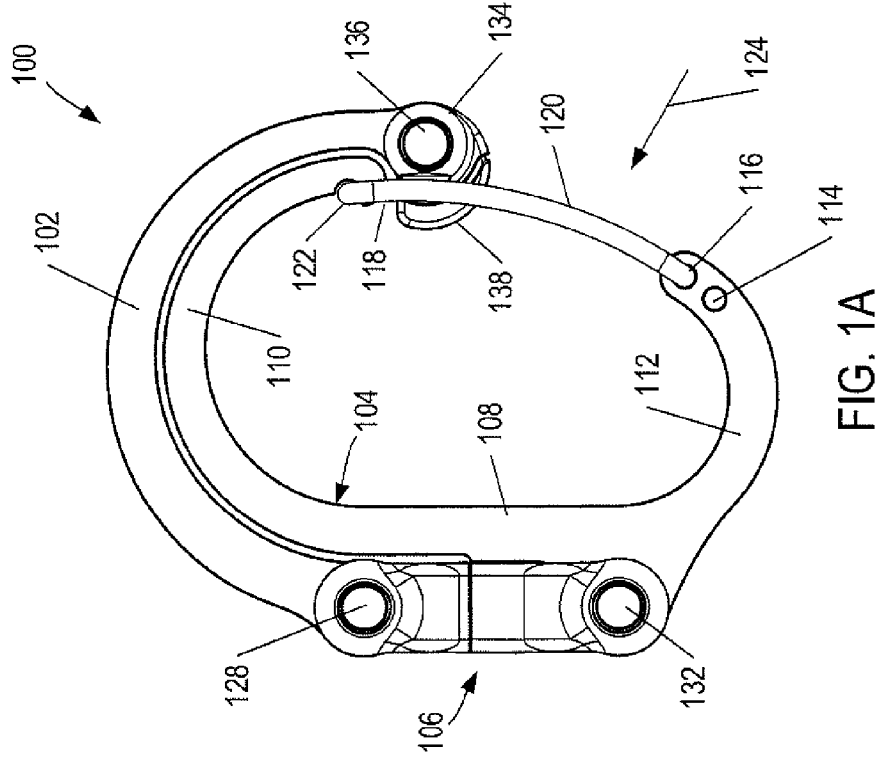

FIGS. 1A-1B show different views of a hook and gated-loop system 100 in a folded configuration. The hook and gated-loop system 100 includes a hook 102, a gated loop 104, and a rotatable hinge 106 that connects the hook 102 to the gated-loop 104. In this embodiment, the gated-loop 104 is an oblong-shaped open ring configured with a straight spline 108 and an arc-shaped or curved large hook 110 opposite an arc-shaped or curved small hook 112, the large hook 110 having a larger radius of curvature than the radius of curvature of the small hook 112. The hook 102 is curved so that when the hook and gated-loop system 100 is in the folded configuration, as shown in FIGS. 1A-1B, the curved outer surface of the large hook 110 fits adjacent to a curved inner surface of the hook 102, and the hook 102 and gated loop 14 are in a planar folded configuration for easy storage. The tip of the small hook 112 includes two parallel holes 114 and 116, and the tip of the large hook 110 includes a flange 118. The gated loop 104 is closed with a wire gate 120 formed from a bent wire with one end of the wire gate 120 inserted into the hole 114 and the other end of the wire gate 120 inserted into the hole 116 on the opposite side of the small hook 112. In FIGS. 1A-1B, the wire gate 120 is closed with a portion 122 of the wire gate 120 resting against the flange 118. When pressure is applied to the wire gate 120 as indicated by directional arrow 124, the wire gate 120 opens creating a twisting tension in the wire gate 120. When the pressure 124 is removed, the tension is released by snapping the wire gate 120 back into the closed position.

FIG. 2A shows an isometric view of the rotatable hinge 106 separate from the hook 102 and the gated loop 104. The rotatable hinge 106 includes a first pair of parallel arms 202 and 204 with aligned holes 206 and 208 and includes a second pair of parallel arm 210 and 212 with aligned holes 214 and 216. Returning to FIG. 1B, the base 126 of the hook 102 fits within the space between a first pair of the parallel arms of the rotatable hinge 106 and includes a hole that is aligned with the holes in the first pair of arms. A first pin 128 that passes through the three aligned holes forms a first hinge pivot axis that connects the rotatable hinge 106 to the hook 102. FIG. 1B also reveals that the gated loop 104 includes a protuberance 130 that protrudes from the spine 108 and fits within the space between a second pair of the parallel arms of the rotatable hinge 106 and includes a hole that is aligned with the holes in the second pair of arms. A second pin 132 that passes through the three aligned holes forms a second hinge pivot axis that connects the rotatable hinge 106 to the gated loop 104.

FIGS. 3A-3B show two exploded isometric views of the rotatable hinge 106. The rotatable hinge 106 includes a U-shaped male end 302 formed from the first pair of parallel arms 202 and 204 and a U-shaped female end 304 formed from the second pair of parallel arms 210 and 212. The U-shaped male end 302 has a cylindrical protrusion 306 that fits within a slightly larger diameter cylindrical hole 308 of the U-shaped female end 304. The rotatable hinge 106 includes a threaded bolt 310 that connects the U-shaped male and female ends 302 and 304 along a central axis 218.

FIG. 2B shows a cross-sectional view of the fully assembled rotatable hinge 106 shown in FIG. 2A. This cross-sectional view shows the cylindrical protrusion 306 of the U-shaped male end 302 inserted in the cylindrical hole 308 of the U-shaped female end 304. FIG. 2B also reveals that the U-shaped male end 302 and the U-shaped female end 304 include cylindrical opens 220 and 222, respectively, along the central axis 218. The cylindrical opening 220 in the U-shaped male end 302 is threaded to engage the threads of the bolt 310. The cylindrical opening 222 is unthreaded and has a larger diameter than the thread diameter of the bolt 310. In this example, when the bolt 310 is screwed into the threaded opening 220 of the U-shaped male end 302, the head 224 of the bolt 310 fits within a cylindrical recess 226 of the U-shaped female end 304. Because the opening 222 is not threaded and has a larger diameter than the threads of the bolt 310, the U-shaped male and female ends 302 and 304 may be freely rotated about the central axis 218 as indicated by double-headed directional arrow 226 in FIG. 2A.

Figure 1C:
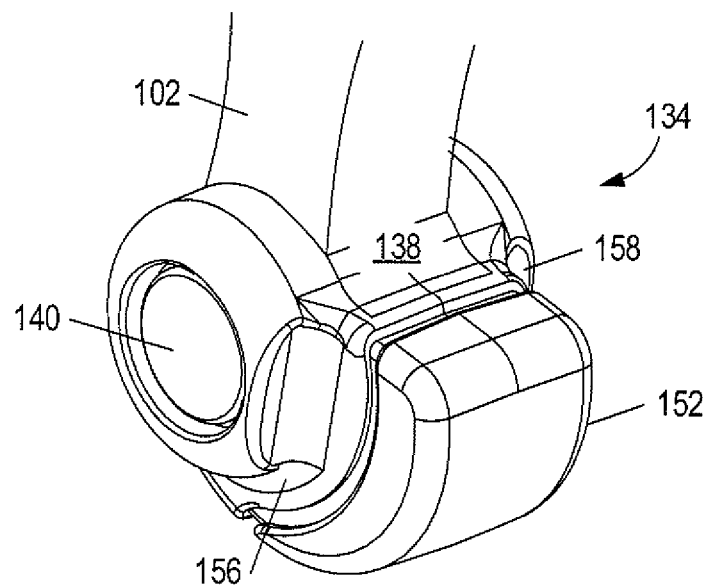
FIG. 1C shows a foot attached to a tip of a hook.
Figure 1D:
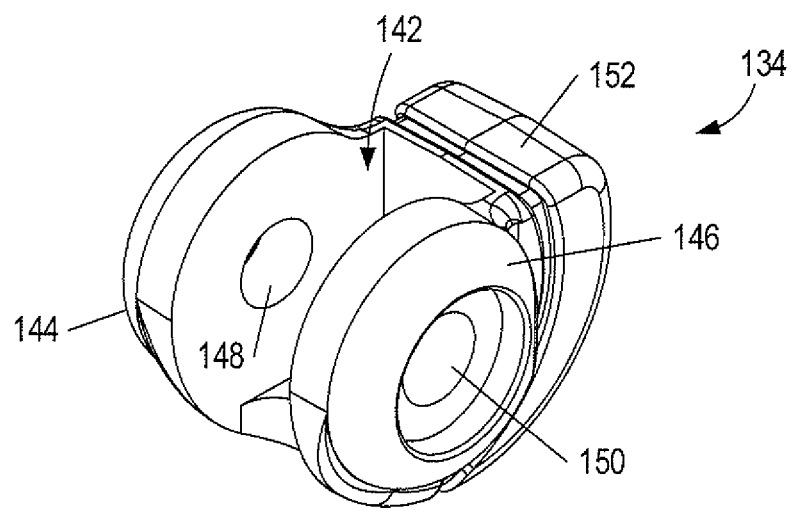
FIG. 1D shows a perspective view of a foot.

Returning to FIGS. 1A-1B, the hook and gated-loop system 100 is maintained in the folded configuration by a foot 134. FIG. 1C shows a magnified view of the foot 134 attached to the tip 138 of the hook 102 by a pin 140. FIG. 1D shows a different isometric view of the foot 134 detached from the tip 138 of the hook 102. The foot 134 includes an opening 142 between to two substantially parallel panels 144 and 146 that are spaced apart to receive the tip 138 of the hook 102. The panels 144 and 146 include aligned holes 148 and 150. As shown in FIG. 1C, the pin 140 passes through a hole in the tip 138 of the hook 102 and the holes 144 and 146 of the foot 134. The foot 134 includes a flange 152 that may be slightly larger or about the same width as the opening 154 between parallel wire sections of the wire gate 120 (shown in FIG. 1B) that engages the parallel wires of the wire gate 120 when the foot 134 is inserted into the wire gate 120 and holds the hook and gated-loop system 100 in a folded configuration. In FIG. 1C, the foot 134 includes recesses 156 and 158 that receive the parallel wires of the wire gate 120 when the foot 134 is inserted into the wire gate 120, as shown in FIGS. 1A-1B. The flange 152 of the foot 134 may also be configured to engage the tip of the large hook 110 of the gated loop 104 to hold the hook and gated-loop system 100 in the folded configuration. The hook and gated-loop system 100 may be switched to an unfolded configuration by applying a force that disengages the foot 134 from the opening 140 in the wire gate 120.

Figures 4A, 4B:
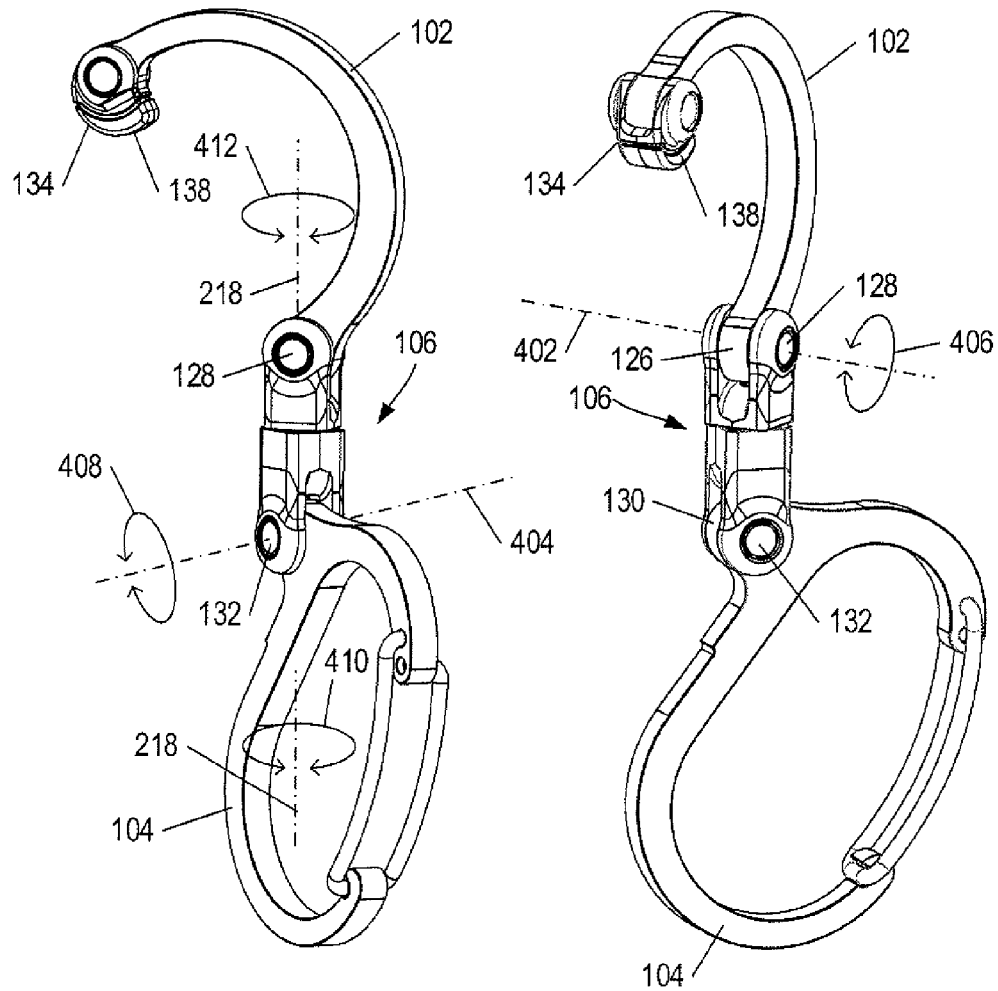
FIGS. 4A-4B show a hook and gated-loop system in an unfolded configuration.

FIGS. 4A-4B show the hook and gated-loop system 100 in an unfolded configuration. The hook 102 may be placed on a surface such that the gated loop 104 is suspended below the surface. Dot-dashed line 402 in FIG. 4B represents the first hinge pivot axis between the rotatable hinge 106 and the hook 102. Dot-dashed line 404 in FIG. 4A represents the second hinge pivot axis between the rotatable hinge 106 and the protuberance 130 of the gated loop 104. Dot-dashed line 218 represents the central pivot axis of the rotatable hinge 106 described above and is orthogonal to the first and second pivot axes. The hook 102 may be rotated about the first pivot axis 402 as represented by double-headed directional arrow 406. The gated loop 104 may be rotated about the second pivot axis 404 as represented by double-headed directional arrow 408. The hook 102 and grated loop 104 may be rotated with respect to each about the central pivot axis 218 as represented by double-headed directional arrows 410 and 412. Rotation about the central pivot axis 218 is orthogonal to rotations about the first and second pivot axes 402 and 404. In other words, the hook and gated-loop system 100 has three pivot axes of rotation when the hook and gated-loop system 100 is in the unfolded configuration. The three pivot axes 402, 404, and 218 enable the hook 102 and gated loop 104 to be rotated with respect to one another in three-dimensional space, as represented by directional arrows 406, 408, 410, and 412.

The hook 102 and gated loop 104 may be made of plastic, aluminum, or metal. The U-shaped male and female ends 302 and 304 of the rotatable hinge 106 may be made of plastic. The pins 128, 132 and 140 may be made of metal, aluminum, or plastic.

FIGS. 4A-4B also show the hook and gated-loop system 100 in a useful orientation. The foot 134 of the hook 102 may be place against a surface or the hook 102 may be hung from an object, such a tree branch, a bar, or handle, and the gated loop 104 hangs down from the hook 102 and is used to attach an item. For example, the handle of bag may inserted into the gate loop 14 and the hook 102 hung from the handle of another bag or piece of luggage. The foot 134 may be composed of a material that creates friction, such as soft rubber or a textured plastic, in order to prevent the hook 102 from slipping off of a surface or an object. For example, the foot 134 may be placed against an uneven surface whereby the foot 134 prevents the hook 102 from sliding off the surface even when the surface is smooth, inclined, or wet. The foot 134 also forms a secondary hook that is directed inward toward the center of the hook 102 to prevent the hook 102 from slipping off a bar or an object.

FIGS. 5A-5B show different isometric views of a hook and gated-loop system 500 in a folded configuration. The hook and gated-loop system 500 includes a hook 502, a gated loop 504, and the rotatable hinge 106 that connects the hook 502 to the gated-loop 504 as described above. The hook 502 and gated loop 504 are similar to the hook 102 and gated loop 104 described above except the large hook 506 portion of the gated loop 504 includes a recess 508 and a foot attached to the tip of the hook 502 includes a bracket 510 that holds an oval-shaped plug 512 that fits within the recess 508 when hook and gated-loop system 500 is in the folded configuration. The bracket 510 may be made of plastic and attached to the hook 502 with glue or a rivet. The plug 512 may be composed of rubber or a flexible textured plastic that prides friction and prevents the hook 502 from slipping as described above.

FIGS. 6A-6D show different views of a hook and gated-loop system 600 in folded and unfolded configurations. The hook and gated-loop system 600 includes a C-shaped hook 602, a C-shaped gated loop 604, and a rotatable hinge 606 that connects the hook 602 to the gated loop 604. The gated loop 604 includes a wire gate 608. As shown in FIGS. 6A and 6C, the rotatable hinge 606 is curved to wrap around the outer surface of the gated loop 604. As shown in FIG. 6D, the rotatable hinge 606 allows the hook and gated-loop system 600 to be unfolded and rotated about three different pivot axes as described above with reference to FIGS. 4A-4B. A foot 610 is attached to the tip of the hook 602 and is configured to pinch the sides of the gated loop 604 and hold the hook and gated-loop system 600 in the folded configuration.

FIGS. 7A-7D show different views of a hook and gated-loop system 700 in folded and unfolded configurations. The hook and gated-loop system 700 includes a hook 702, a gated loop 704, and a rotatable hinge 706 that connects the hook 702 to the gated loop 704. The gated loop 704 includes a wire gate 708. As shown in FIG. 7D, the rotatable hinge 706 is composed of a pin 710 that connects the hook 702 to the gated loop 704. The pin 710 creates a pivot axis 712 that enables the hook 702 and gated loop 704 to rotate with respect to one another as represent by directional arrow 714. The rotatable hinge 706 also includes a rotation joint 716 located within the base of the hook 702 that enables the hook 702 and gated loop 704 to be rotated about a central pivot axis 718 as represented by directional arrow 720. The hook 702 includes a foot 722 fits within a recess 724 of the gated loop 704 and maintains the folded configuration shown in FIGS. 7A-7C. The foot 722 may be composed rubber or a textured plastic to create friction with a surface.

FIGS. 8A-8D show different views of a hook and gated-loop system 800 in folded and unfolded configurations. The hook and gated-loop system 800 includes a hook 802, a gated loop 804, and a cable 806 that connects the hook 802 to the gated loop 804. The gated loop 804 includes a wire gate 808 that is embedded within one end of the gated loop 804. As shown in FIGS. 8A-8C, the hook and gated-loop system 800 are in a folded configuration with the hook 802 and gated loop 804 side by side. The cable 806 may be composed of flexible plastic or rubber or the cable 806 may be a chain, a rope, or another suitable flexible material. As shown in FIG. 8D, the hook 802 and gated loop 804 include apertures 810 and 812, respectively, that when placed in the folded configuration shown in FIGS. 8A-8C, form a single aperture 814. The tip of the hook 802 is covered with a rubber sleeve 816 that serves as a foot to prevent the hook 802 from slipping when the tip of the hook is placed on a surface.

Figures 9A, 9B:
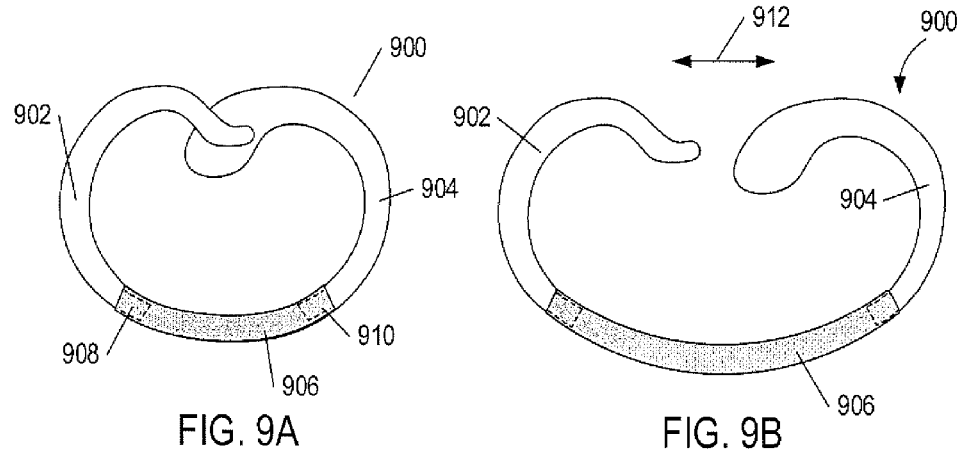
FIGS. 9A-9B show a flexible double hook system.

FIG. 9A shows a flexible double hook system 900. The double hook system 900 includes a first hook 902, a second hook 904, and a flexible curved joint 906 that connects the first hook 902 to the second hook 904. As shown in FIG. 9A, the joint 906 encases bases 908 and 910 of the first and second hooks 902 and 904, respectively. The flexible curved joint 906 is formed so that the natural configuration of the double hook system 900 is the first and second hooks 902 and 904 are touching or in contact to form a closed loop, as shown in FIG. 9A, when the double hook system 900 is not in use. In FIG. 9B, double-headed arrow 912 represents applying a force to the first and second hooks 902 and 904 that stretches the joint 906 when the hooks 902 and 904 are pulled apart. The flexible curved joint 906 maintains tension and the double hook system 900 may be used to connect at least two items together. The hooks 902 and 904 may be composed of plastic, aluminum, or a metal, and the flexible curved joint 906 may be composed of rubber.

Figure 10:
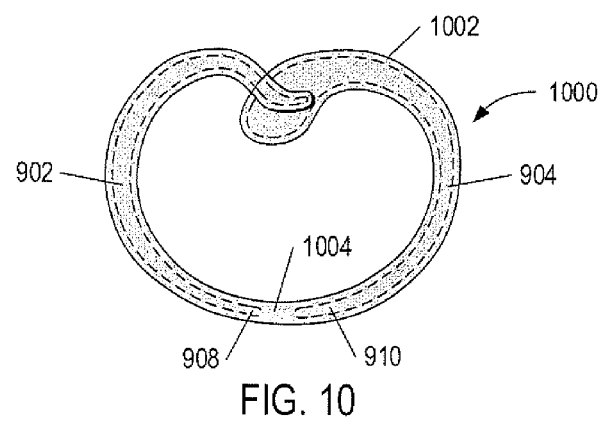
FIG. 10 shows a flexible double hook system embedded in a flexible coating.

FIG. 10 shows a flexible double hook system 1000. The double hook system 1000 includes the first and second hooks 902 and 904 embedded within a flexible rubber coating 1002 that includes a space 1004 between the bases 908 and 910 of the first hook 902 to the second hook 904. The double hook system 1000 may be operated in the same manner as the double hook system 900.

Figures 11A, 11B:
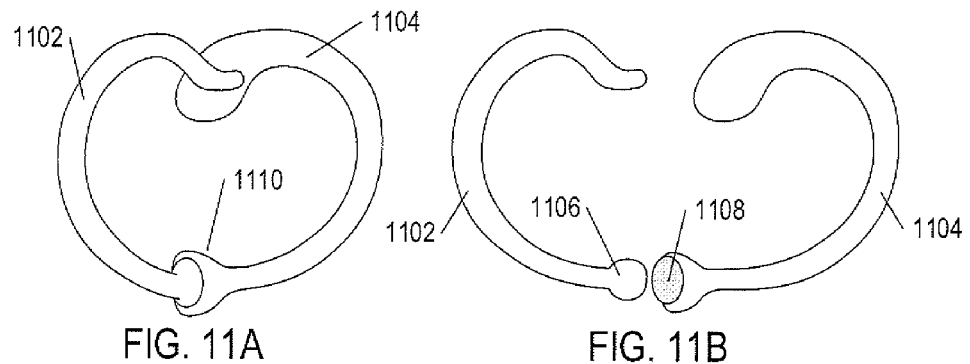
FIGS. 11A-11B show a flexible double hook system with a ball-and-socket joint.

FIGS. 11A-11B show a double hook system 1100 composed of a first hook 1102 with a ball 1104 located at one end and a hook 1106 with a socket 1108 located at one end. The socket 1108 is configured so that the ball 1104 fits within the socket 1108 and is partially enclosed by the socket 1108, which forms a ball-and-socket joint 1110 that connects the first and second hooks 1102 and 1106 together and enables the first hook 1102 and the second hook 1106 to freely rotated with respect to one another and be used to connect at least two items together. The first and second hooks 1102 and 1106 may be made or plastic, aluminum, or metal.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A hanging system comprising:
   a hook;
   a gated loop;
   a rotatable hinge connected to a base of the hook with a first pin that forms a first pivot axis and connected to the gated loop with a second pin that forms a second pivot axis, the rotatable hinge having a central pivot axis that is orthogonal to the first and second pivot axes, wherein the first, second, and central pivot axes enable the hook and gated loop to be rotated with respect to each other in three dimensions; and
   a foot attached to a tip of the hook, the foot configured to attach to the gated loop and hold the hanging system in a folded configuration.

2. The hanging system of claim 1 wherein the foot is configured to fit within an opening of the gated loop and hold the hanging system in a folded configuration.

3. The handing system of claim 1, wherein the folded configuration comprises the hook and the gated loop to be placed with an outer surface of the gated loop adjacent to an inner surface of the hook.

4. The hanging system of claim 1, wherein the rotatable hinge comprises:
   a U-shaped male end having cylindrical protrusion and a pair of parallel arms attached to the hook to form the first pivot axis or attached to the gated loop to form the second pivot axis;
   a U-shaped female end having a cylindrical hole configured to receive the cylindrical protrusion and a pair of parallel arms attached to the hook to form the first pivot axis or attached to the gated loop to form the second pivot axis; and
   a bolt that attaches the U-shaped female end to the U-shaped male end with the cylindrical protrusion inserted into the cylindrical hole along the central pivot axis.

5. The hanging system of claim 1 wherein the foot is configured to pinch the gated loop and hold the hanging system in a folded configuration.

6. The hanging system of claim 1 wherein the foot forms a secondary hook directed inward toward the center of the hook.

7. A hanging system comprising:
   a hook;
   a gated loop;
   a rotatable hinge connected to a base of the hook with a first pin that forms a first pivot axis and connected to the gated loop with a second pin that forms a second pivot axis, the rotatable hinge having a central pivot axis that is orthogonal to the first and second pivot axes, wherein the first, second, and central pivot axes enable the hook and gated loop to be rotated with respect to each other in three dimensions; and
   a foot attached to a tip of the hook, the foot configured to fit within an opening of the gated loop and hold the hanging system in a folded configuration.

8. The hanging system of claim 7 wherein the foot forms a secondary hook directed inward toward the center of the hook.

9. The handing system of claim 7 wherein the folded configuration comprises the hook and the gated loop to be placed with an outer surface of the gated loop adjacent to an inner surface of the hook.

10. The hanging system of claim 7 wherein the rotatable hinge comprises:

a U-shaped male end having cylindrical protrusion and a pair of parallel arms attached to the hook to form the first pivot axis or attached to the gated loop to four' the second pivot axis;

a U-shaped female end having a cylindrical hole configured to receive the cylindrical protrusion and a pair of parallel arms attached to the hook to form the first pivot axis or attached to the gated loop to form the second pivot axis; and a bolt that attaches the U-shaped female end to the U-shaped male end with the cylindrical protrusion inserted into the cylindrical hole along the central pivot axis.

11. A hanging system comprising:

a hook;

a gated loop; and a rotatable hinge connected to a base of the hook with a first pin that forms a first pivot axis and connected to the gated loop with a second pin that forms a second pivot axis, the rotatable hinge having a central pivot axis that is orthogonal to the first and second pivot axes, wherein the first, second, and central pivot axes enable the hook and gated loop to be rotated with respect to each other in three dimensions and enable the hook and the gated loop to be placed in a substantially planar folded configuration with an outer surface of the gated loop adjacent to an inner surface of the hook.

12. The hanging system of claim 11 further comprising a foot attached to a tip of the hook, the foot configured to attach to a gate of the gated loop and hold the hanging system in the folded configuration.

13. The hanging system of claim 11 further comprising a foot attached to a tip of the hook, the foot configured to fit within an opening in a gate of the gated loop and hold the hanging system in the folded configuration.

14. The hanging system of claim 11 wherein the foot is configured to pinch the gated loop and hold the hanging system in the folded configuration.

15. The hanging system of claim 11 wherein the rotatable hinge further comprises:

a U-shaped male end having cylindrical protrusion and a pair of parallel awls attached to the hook to form the first pivot axis or attached to the gated loop to form the second pivot axis;

a U-shaped female end having a cylindrical hole configured to receive the cylindrical protrusion and a pair of parallel arms attached to the hook to form the first pivot axis or attached to the gated loop to form the second pivot axis; and a bolt that attaches the U-shaped female end to the U-shaped male end with the cylindrical protrusion inserted into the cylindrical hole along the central pivot axis.

* * * * *